US011533286B1

(12) United States Patent
Clediere

(10) Patent No.: US 11,533,286 B1
(45) Date of Patent: Dec. 20, 2022

(54) SYSTEMS AND METHODS FOR MULTILEVEL COMMENT THREADING

(71) Applicant: Meta Platforms, Inc., Menlo Park, CA (US)

(72) Inventor: Robin Maxime Clediere, Lynnwood, WA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 16/529,024

(22) Filed: Aug. 1, 2019

(51) Int. Cl.
*G06F 3/0482* (2013.01)
*H04L 51/216* (2022.01)
*H04L 51/52* (2022.01)
*G06F 3/04817* (2022.01)
*G06F 3/04883* (2022.01)

(52) U.S. Cl.
CPC ............ *H04L 51/52* (2022.05); *G06F 3/0482* (2013.01); *G06F 3/04817* (2013.01); *G06F 3/04883* (2013.01); *H04L 51/216* (2022.05)

(58) Field of Classification Search
None
See application file for complete search history.

(56) References Cited

U.S. PATENT DOCUMENTS

| | | | | |
|---|---|---|---|---|
| 8,332,477 B1 * | 12/2012 | Kaiserlian | ............. | H04L 51/216 |
| | | | | 709/206 |
| 8,966,404 B2 * | 2/2015 | Lee | .................... | G06F 3/04883 |
| | | | | 715/853 |
| D841,677 S | 2/2019 | Tyler | | |
| D847,182 S | 4/2019 | Maier et al. | | |
| D853,424 S | 7/2019 | Maier et al. | | |
| D854,037 S | 7/2019 | Maier et al. | | |
| D858,555 S | 9/2019 | Krishna | | |
| D868,089 S | 11/2019 | Jang et al. | | |
| D874,491 S | 2/2020 | Kuo et al. | | |
| D874,496 S | 2/2020 | Jang et al. | | |
| D875,119 S | 2/2020 | Liu | | |
| D879,822 S | 3/2020 | Dalonzo | | |
| D881,221 S | 4/2020 | Chen et al. | | |
| D884,009 S | 5/2020 | Hong et al. | | |
| D894,210 S | 8/2020 | Dascola et al. | | |
| D896,258 S | 9/2020 | Felkins et al. | | |
| D901,525 S | 11/2020 | Carrigan et al. | | |
| D901,527 S | 11/2020 | Maier et al. | | |
| D901,530 S | 11/2020 | Maier et al. | | |
| D905,099 S | 12/2020 | Lim et al. | | |
| D910,056 S | 2/2021 | Unnikrishnan et al. | | |
| D910,057 S | 2/2021 | Matsumoto et al. | | |
| D910,697 S | 2/2021 | Lemay et al. | | |
| D911,382 S | 2/2021 | Devine et al. | | |
| D912,694 S | 3/2021 | Clarke et al. | | |
| D916,794 S | 4/2021 | Li et al. | | |
| D916,848 S | 4/2021 | Jang et al. | | |
| D918,959 S | 5/2021 | Song et al. | | |
| D919,644 S | 5/2021 | Jang et al. | | |

(Continued)

*Primary Examiner* — Linda Huynh
(74) *Attorney, Agent, or Firm* — Sheppard Mullin Richter & Hampton LLP

(57) ABSTRACT

Systems, methods, and non-transitory computer-readable media can be configured to present a comment thread including at least one comment. A selection of the at least one comment presented in the comment thread can be determined. A reply thread based at least in part on the at least one comment can be presented.

20 Claims, 10 Drawing Sheets

(56) References Cited

U.S. PATENT DOCUMENTS

| | | | |
|---|---|---|---|
| D920,367 S | 5/2021 | Luo et al. | |
| D921,657 S | 6/2021 | Jang et al. | |
| D925,564 S | 7/2021 | Zhao et al. | |
| D925,573 S | 7/2021 | Dascola et al. | |
| D928,813 S | 8/2021 | Nurutdinov et al. | |
| 2007/0282956 A1* | 12/2007 | Staats | H04L 51/22 709/206 |
| 2008/0082607 A1* | 4/2008 | Sastry | G06F 16/986 707/E17.118 |
| 2010/0229127 A1* | 9/2010 | Williams | G06Q 10/107 715/854 |
| 2012/0023455 A1* | 1/2012 | Chen | G06F 16/248 715/853 |
| 2013/0125058 A1* | 5/2013 | Lee | G06F 3/0482 715/853 |
| 2013/0125063 A1* | 5/2013 | Lee | G06F 3/04883 715/854 |
| 2014/0280236 A1* | 9/2014 | Faller | G06F 16/24578 707/749 |
| 2015/0052421 A1* | 2/2015 | Thomson | G06F 16/9577 715/206 |
| 2017/0139919 A1* | 5/2017 | Ball | G06F 16/24578 |
| 2017/0351385 A1* | 12/2017 | Ertmann | G06Q 10/107 |
| 2018/0095940 A1* | 4/2018 | Meixner | H04L 51/046 |
| 2018/0337918 A1 | 11/2018 | Chang et al. | |
| 2018/0367483 A1 | 12/2018 | Rodriguez et al. | |
| 2019/0238489 A1* | 8/2019 | Cohen | H04L 51/216 |
| 2019/0327197 A1* | 10/2019 | Rose | H04L 51/216 |
| 2021/0133681 A1* | 5/2021 | Dhaliwal | G06Q 10/101 |

* cited by examiner

Reply Thread Module 252

Reply Thread Display Module 254

Reply Thread Interaction Module 256

SYSTEMS AND METHODS FOR MULTILEVEL COMMENT THREADING

FIELD OF THE INVENTION

The present technology relates to the field of social networking systems. More particularly, the present technology relates to techniques for visualizing comment threads and interacting with comment threads associated with social networking systems.

BACKGROUND

Today, people often utilize computing devices (or systems) for a wide variety of purposes. For example, users can utilize computing devices to access a social networking system (or service). The users can utilize the computing devices to interact with one another, create content items, share content items, and view content items via the social networking system. For example, a user may share a content item, such as an image, a video, an article, or a link, via a social networking system. Another user may access the social networking system and interact with the shared content item. In some cases, the other user can interact with the shared content item by posting a comment associated with the shared content item.

SUMMARY

Various embodiments of the present technology can include systems, methods, and non-transitory computer readable media configured to present a comment thread including at least one comment. A selection of the at least one comment presented in the comment thread can be determined. A reply thread based at least in part on the at least one comment can be presented.

In some embodiments, a selection of a reply included in the reply thread can be determined. Another reply thread based at least in part on the reply can be presented.

In some embodiments, a selection of the reply thread can be determined. A next reply thread based at least in part on a next comment in the comment thread can be presented in response to the selection.

In some embodiments, a selection of a return button included in the reply thread can be determined. The comment thread can be presented based at least in part on the selection.

In some embodiments, a selection of the reply thread can be determined. The reply thread and the comment thread can be closed based at least in part on the selection.

In some embodiments, the at least one comment can be associated with a set of replies, the comment thread can include a subset of the set of replies, and the subset can be determined based at least in part on a ranking of the set of replies.

In some embodiments, the at least one comment is associated with an indication that the at least one comment is interactive.

In some embodiments, the comment thread includes at least one reply and the at least one reply overlaps with the at least one comment.

In some embodiments, the at least one comment includes a text message and a content item and the reply thread displays the text message and the content item as a topic.

In some embodiments, the selection of the at least one comment is based at least in part on a touch gesture.

It should be appreciated that many other features, applications, embodiments, and/or variations of the present technology will be apparent from the accompanying drawings and from the following detailed description. Additional and/or alternative implementations of the structures, systems, non-transitory computer readable media, and methods described herein can be employed without departing from the principles of the present technology.

Figure 1:
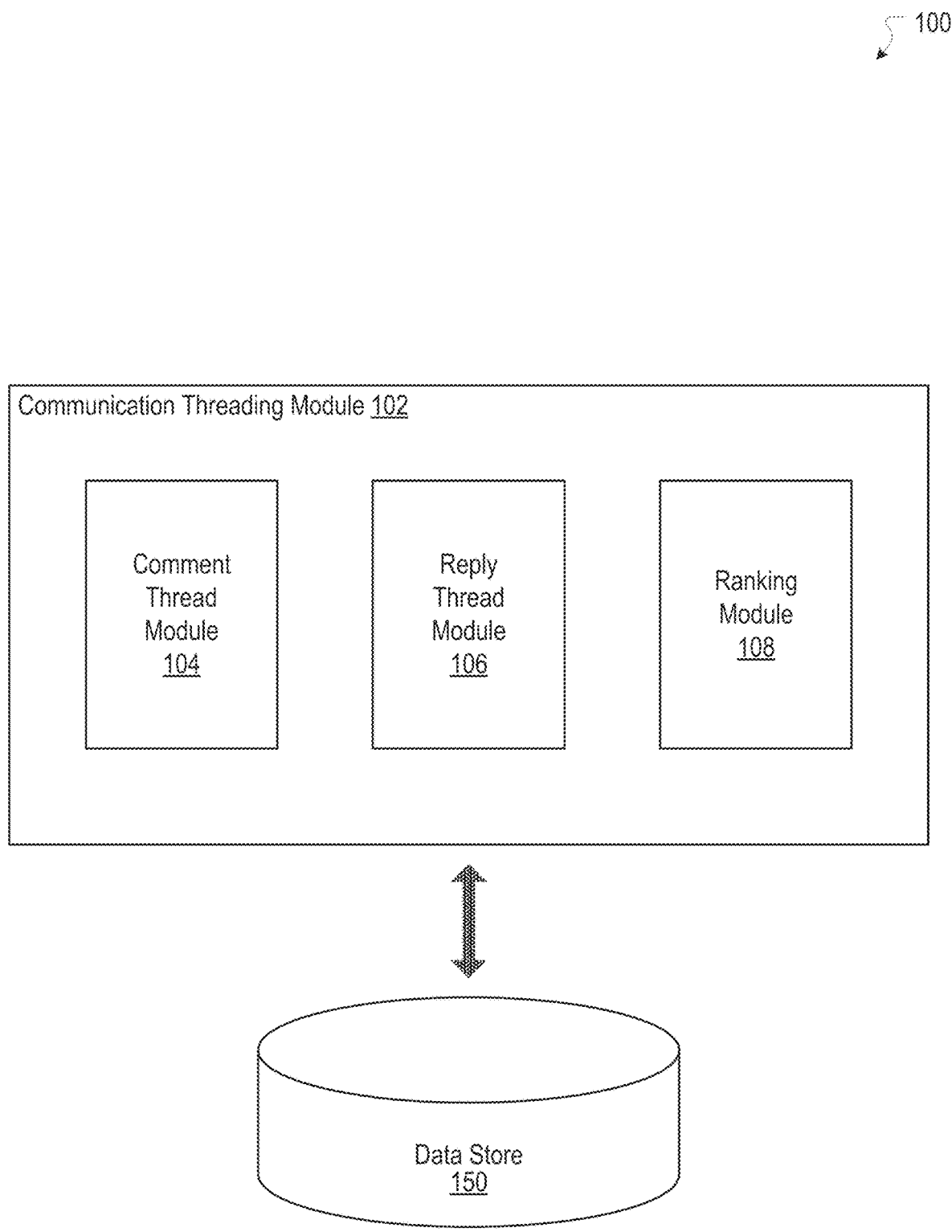
FIG. 1 illustrates an example system including an example communication threading module, according to an embodiment of the present technology.

The figures depict various embodiments of the present technology for purposes of illustration only, wherein the figures use like reference numerals to identify like elements. One skilled in the art will readily recognize from the following discussion that alternative embodiments of the structures and methods illustrated in the figures can be employed without departing from the principles of the present technology described herein.

DETAILED DESCRIPTION

Approaches for Multilevel Comment Threading

Today, people often utilize computing devices (or systems) for a wide variety of purposes. For example, users can utilize computing devices to access a social networking system (or service). The users can utilize the computing devices to interact with one another, create content items, share content items, and view content items via the social networking system. For example, a user may share a content item, such as an image, a video, an article, or a link, via a social networking system. Another user may access the content item via the social networking system and, in some cases, post a comment associated with the shared content item. In such cases, the social networking system can provide the posted comment along with the shared content item to other users who access the content item.

Under conventional approaches, a user can access a variety of content items, such as images, videos, articles, and links, provided by a social networking system. Some of these content items can be associated with a number of comments, and such comments be provided along with the content items with which they are associated. In some cases, a user can access a content item and associated comments via a social networking system and wish to reply to one of the associated comments. Under conventional approaches, users cannot directly interact with comments associated with a content item. Further, under conventional approaches, the comments associated with the content item are lumped together and, when presented along with the content item, can be incoherent and confusing. The incoherence and confusion are exacerbated as users post additional comments associated with the content item and further exacerbated as the number of content items and associated comments increases. Accordingly, conventional approaches for presenting comments fail to provide users with ways to interact with the comments and fail to address challenges of incoherence and confusion associated with an increasing number of comments. Thus, conventional approaches are ineffective in addressing these and other challenges arising in computer technology.

An improved approach rooted in computer technology overcomes the foregoing and other disadvantages associated with conventional approaches specifically arising in the realm of computer technology. In various embodiments, the present technology provides for presenting a comment thread that allows users to post comments to the comment thread and interact with the comments in the comment thread. A comment thread can be, for example, associated with a content item accessed via a social networking system, and the content item can be displayed within the comment thread. A user can post comments to the comment thread, for example, through a text input, and the posted comments can be displayed in the comment thread. Comments in the comment thread can be interactive, and the comments can be marked with an indication (e.g., shadow, button, etc.) signifying that the comments are interactive. The user can interact with a comment by selecting the comment, for example, with a touchscreen input, and be presented with a reply thread corresponding to the selected comment. The selected comment can be displayed in the reply thread along with replies associated with the selected comment. The user can post a reply to the selected comment, for example, through a text input, and the posted reply can be displayed in the reply thread. Also, the user can select a reply in the reply thread, which can be marked with an indication (e.g., shadow, button, etc.) signifying that the reply is interactive, and be presented with another reply thread corresponding to the selected reply. The user can also return to the comment thread, for example, by selecting a return button in the reply thread. In some cases, a comment thread can display comments and replies. The comments can be identified by being interactive and by being marked with an indication signifying that the comments are interactive. The replies can be identified by being indented such that the replies are aligned differently from the comments. A correspondence between a reply and its associated comment can be indicated by the reply overlapping the associated comment. For example, a user may watch a video through a social networking system and decide to post a comment in response to watching the video. The user can be presented with a comment thread associated with the video. The comment thread can include comments made by other users as well as replies made in response to the comments. In the comment thread, the user may read a particular comment and wish to respond to the particular comment. The user can select the particular comment and be presented with a reply thread corresponding to the particular comment. The user can post a reply to the particular comment through the reply thread. The posted reply can be presented in the reply thread and the comment thread. In the comment thread, the posted reply can appear to be indented and overlapping the particular comment. Additional details relating to the present technology are provided below.

FIG. 1 illustrates an example system 100 including an example communication threading module 102, according to an embodiment of the present technology. As shown in the example of FIG. 1, the communication threading module 102 can include a comment thread module 104, a reply thread module 106, and a ranking module 108. In some embodiments, the example system 100 can include one or more data store(s) 150. The components (e.g., modules, elements, etc.) shown in this figure and all figures herein are exemplary only, and other implementations may include additional, fewer, integrated, or different components. Some components may not be shown so as not to obscure relevant details.

In some embodiments, the communication threading module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some embodiments, the communication threading module 102 can be, in part or in whole, implemented within or configured to operate in conjunction with or be integrated with a social networking system (or service), such as a social networking system 630 of FIG. 6. Likewise, in some instances, the communication threading module 102 can be, in part or in whole, implemented within or configured to operate in conjunction with or be integrated with a client computing device, such as the user device 610 of FIG. 6. For example, the communication threading module 102 can be implemented as or within a dedicated application (e.g., app), a program, or an applet running on a user computing device or client computing system. The application incorporating or implementing instructions for performing functionality of the communication threading module 102 can be created by a developer. The application can be provided to or maintained in a repository. In some cases, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that many variations are possible.

The communication threading module 102 can be configured to communicate and/or operate with the at least one data store 150, as shown in the example system 100. The at least one data store 150 can be configured to store and maintain various types of data including, for example, comment threads and reply threads. In some implementations, the at least one data store 150 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 150 can store information associated with users, such as user identifiers, user information, profile information, user specified settings, content produced or posted by users, and various other types of user data.

In various embodiments, the comment thread module 104 can generate a comment thread and present the comment thread. A comment thread can be generated based on one or more comments, and any replies associated with the comments. The comments in the comment thread can be displayed in a first arrangement. For example, the comments can be ordered vertically and aligned with a left margin of the comment thread. The replies in the comment thread can be displayed in a second arrangement. For example, the replies can be indented from the left margin of the comment thread, and the replies can be ordered vertically below their corresponding comments with one reply overlapping, to a degree, one corresponding comment. The order of the comments and the order of the replies can be based on a ranking of the comments and a ranking of the replies, respectively. For example, the one reply overlapping the one corresponding comment can be determined based on a ranking of the one reply compared to other replies associated with the one corresponding comment. The comment thread module 104 can also provide for interactions with a comment thread. The interactions can include, for example, a user selecting a comment in the comment thread. Upon selection of the comment in the comment thread, a reply thread corresponding to the selected comment can be presented. More details regarding the comment thread module 104 will be provided with reference to FIG. 2A.

In various embodiments, the reply thread module 106 can generate a reply thread and present the reply thread. The reply thread can be generated based on a corresponding comment and can include replies to the corresponding comment and sub-replies associated with the replies. A corresponding comment can be displayed, for example, at the top of a reply thread, and any replies and sub-replies can be displayed below the corresponding comment. The replies to the corresponding comment can be displayed in a first arrangement. For example, the replies can be ordered vertically and aligned with a left margin of the reply thread. The sub-replies in the reply thread can be displayed in a second arrangement. For example, the sub-replies can be indented from the left margin of the reply thread. The replies and sub-replies can be ordered based on a ranking of the replies and a ranking of the sub-replies, respectively. For example, a sub-reply can overlap a corresponding reply, and the overlapping sub-reply can be determined based on a ranking of sub-replies associated with the corresponding reply. The reply thread module 106 can provide for interactions with a reply thread. The interactions can include, for example, selecting a button to return to a comment thread and selecting a reply to be presented with another reply thread corresponding to the selected reply. More details regarding the reply thread module 106 will be provided with reference to FIG. 2B.

In various embodiments, the ranking module 108 can generate a ranking of comments, a ranking of replies, and a ranking of sub-replies. The ranking of comments, the ranking of replies, and the ranking of sub-replies can be based on activity or popularity associated with the comments, the replies, and the sub-replies, respectively. Activity or popularity of comments, replies, and sub-replies can be determined based on a number of views, a number of shares, a number of replies, a number of positive reactions (e.g., likes, loves, etc.), and a number of negative reactions (e.g., dislikes, etc.) associated with each of the comments, the replies, and the sub-replies. For example, a comment, reply, or sub-reply can be determined to be more active than another comment, reply, or sub-reply based on a higher number of replies, and the comment, reply, or sub-reply can be determined to be less active than the other comment, reply, or sub-reply based on a lower number of replies. As another example, a comment, reply, or sub-reply can be determined to be more popular than another comment, reply, or sub-reply based on a higher number of likes, and the comment, reply, or sub-reply can be determined to be less popular than the other comment, reply, or sub-reply based on a lower number of likes. Many variations are possible.

Figure 2A:
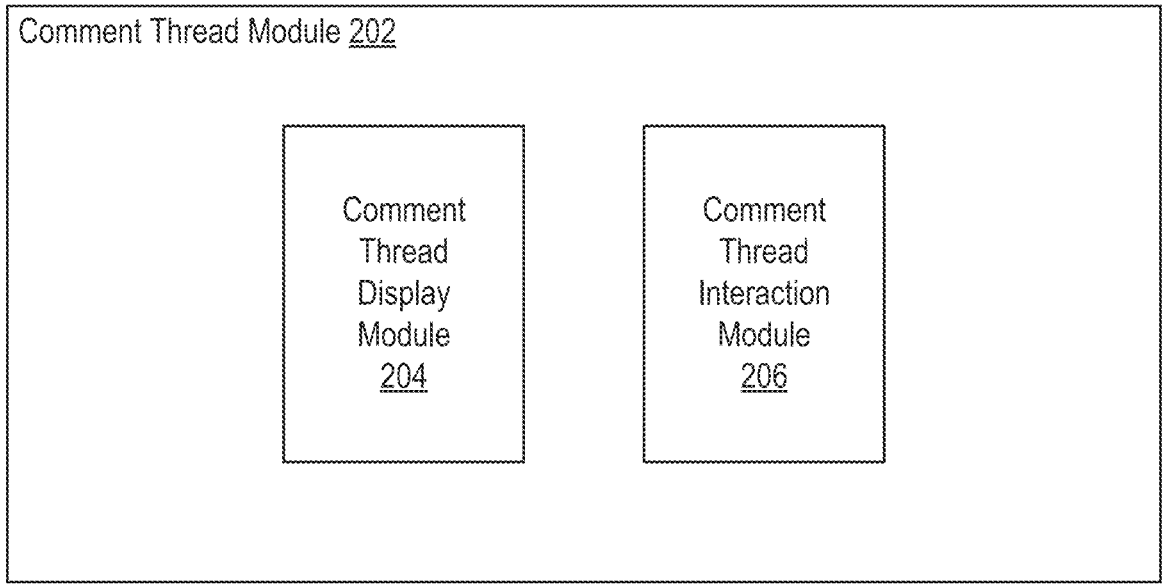
FIG. 2A illustrates an example comment thread module, according to an embodiment of the present technology.

FIG. 2A illustrates an example of a comment thread module 202 configured to generate a comment thread, present the comment thread, and provide for interactions with the comment thread, according to an embodiment of the present technology. In some embodiments, the comment thread module 104 of FIG. 1 can be implemented as the comment thread module 202. As shown in FIG. 2A, the comment thread module 202 can include a comment thread display module 204 and a comment thread interaction module 206.

The comment thread display module 204 can generate a comment thread and present the comment thread. The comment thread display module 204 can generate a comment thread to include one or more comments, replies, and sub-replies. The comment thread can be associated with a content item (e.g., emoji, image, video, article, link, etc.). The comments in the comment thread can be comments posted by users in response to the content item associated with the comment thread. The replies in the comment thread can be replies posted by users in response to the comments in the comment thread. The sub-replies in the comment thread can be sub-replies posted by users in response to the replies in the comment thread. In some cases, a comment, reply, or sub-reply in a comment thread can be displayed in a container. The comment, reply, or sub-reply can be a text message, and the text message can be displayed in the container. The comment, reply, or sub-reply, in some cases, can be a content item or a combination of a text message and a content item, and the content item or the combination of the text message and the content item can be displayed in the container.

The comment thread display module 204 can present a comment thread based on arrangements associated with comments, replies, and sub-replies in the comment thread. Comments can be displayed in a comment thread based on a first arrangement associated with the comments. Replies can be displayed in a comment thread based on a second arrangement associated with the replies. Sub-replies can be displayed in a comment thread based on a third arrangement associated with the sub-replies. As one example, comments in a comment thread can be displayed as aligned with a left margin of the comment thread, ordered vertically, and spaced a set distance apart from one another, in accordance with a first arrangement. Replies in the comment thread can be displayed indented from the left margin of the comment thread, ordered vertically below the comments with which the replies are associated, and spaced a set distance from one another, in accordance with a second arrangement. A top reply can overlap with an associated comment such that a top portion of a container including the top reply overlaps with a bottom portion of a container including the associated comment, in accordance with the second arrangement. Sub-replies in the comment thread can be displayed further indented from the left margin of the comment thread, ordered vertically below the replies with which the sub-replies are associated, and spaced a set distance apart from one another, in accordance with a third arrangement. A top sub-reply can overlap with an associated reply such that a top portion of a container including the top sub-reply overlaps with a bottom portion of a container including the associated reply, in accordance with the third arrangement. In some cases, a comment thread can display comments and replies without displaying sub-replies. A number of comments, replies, and sub-replies displayed in a comment thread can vary based on various considerations. A comment thread can display comments, replies, and sub-replies based on a total number of comments, replies, and sub-replies being within a threshold value (e.g., 3, 4, or 5 total comments, replies and sub-replies). A comment thread can display comments and replies without displaying sub-replies based on a total number of comments, replies, and sub-replies exceeding a threshold value. In some cases, a comment thread can display comments and a limited number of replies. A comment thread can display a comment and replies associated with the comment based on a number of replies associated with the comment being within a threshold value (e.g., 2, 3, or 4 replies). A comment thread can display a comment and a top reply or top replies associated with the comment based on a number of replies associated with the comment exceeding a threshold value. A container indicating a number of replies (and sub-replies) not displayed in the comment thread can be displayed along with the top reply or the top replies. For example, a comment thread can include a comment and two replies associated with the comment. The comment and the two replies can be displayed in the comment thread. Continuing the example, two additional replies associated with the comment can be posted by users, causing the number of replies associated with the comment to exceed a threshold value of two (or three) replies. When the comment thread is presented, the comment and the top two replies associated with the comment can be displayed. A container indicating that two replies are not displayed can be displayed in the comment thread. The container can display, for example, "+2 more." Many variations are possible.

The comment thread display module 204 can present a comment thread that displays comments in an order based on time associated with when each comment was posted. Comments that are posted more recently in time can be ordered higher in the comment thread than comments that are posted later in time, or vice-versa. Replies and sub-replies in the comment thread can also be displayed based on time associated with when each was posted. Replies and sub-replies that are posted more recently in time can be ordered higher than replies and sub-replies that are posted later in time, or vice-versa. In some cases, comments in a comment thread can be displayed in an order based on a ranking associated with the comments. Comments can be ranked, for example, based on activity or popularity, as described above. Comments that are more active or more popular can be ordered higher in a comment thread than comments that are less active or less popular. In some cases, comments in a comment thread can be ordered based on time associated with when each comment was posted and a comment that is more active or more popular can be displayed with an indication that the comment is active or popular. For example, a comment thread can display comments with older comments at the top of the comment thread and newer comments at the bottom of the comment thread. As another example, a fire emoji or a lightning emoji can be displayed along with a comment that has more likes or more replies than other comments in the comment thread. In cases where a comment thread displays comments and a limited number of replies, the limited number of replies can be based on a time associated with when each reply was posted or a ranking associated with the replies. In some cases, the comment thread display can display a comments and replies associated with the comment that are more recent than other replies associated with the comment. In other cases, the comment thread can display a comment and replies associated with the comment that are more active or more popular than other replies associated with the comment. For example, a comment thread can display comments and a top reply associated with each comment. The top reply can be determined based on a number of likes associated with each reply associated with each comment. Each comment can be displayed with the top reply, which can be the reply associated with the comment that has the more likes than other replies associated with the comment. Many variations are possible.

The comment thread interaction module 206 can provide for interactions with a comment thread. Interactions with a comment thread can include posting a comment, navigating to another comment thread, and closing a comment thread. A user can post a comment to a comment thread through an input field displayed in the comment thread. The user can input text in the input field and post a text message comment to the comment thread. The user can also post a content item to the comment thread by utilizing the input field. A user can navigate to another comment thread by utilizing a touch gesture, such as a swipe gesture, or other input applied to a computing device through which the comment threads are displayed. For example, a user may be presented with a comment thread associated with a content item in a feed. The user can swipe right on the comment thread and be presented with a next comment thread associated with a next content item in the feed. The user can swipe left on the next comment thread and be presented with a previous comment thread, which in this example, is the original comment thread. A user can also close a comment thread by utilizing a touch gesture or other input. For example, a user may swipe down on a comment thread to close the comment thread. Many variations are possible.

The comment thread interaction module 206 can provide for interactions with comments in a comment thread and with containers including the comments. A user can select a comment by utilizing a touch gesture, such as a tap, or other input and be presented with a reply thread corresponding to the selected comment. A container including the comment can include various points of interaction. The container can include a profile image of a person who posted the comment. A user can interact with the profile image, such as by tapping the profile image, and be presented with a profile page associated with the person who posted the comment. The container can include a call to action associated with the comment. The call to action can correspond, for example, with a like function, a share function, or other function. A user can interact with the call to action, such as by tapping the call to action, to like or share the comment. In some cases, comments in a comment thread can be interactive and replies and sub-replies in the comment thread can be non-interactive. Comments in a comment thread can be displayed with indications that signify that the comments are interactive. The indications can include, for example, shadows around containers including the comments, shading around or within the containers, or a symbol overlapping or adjacent to the containers. These indications may not be displayed with containers including replies and sub-replies, signifying that the replies and sub-replies are non-interactive. To interact with a reply, a user can select a comment in a comment thread to access a reply thread corresponding to the selected comment and interact with the reply in the reply thread. Many variations are possible.

Figure 2B:
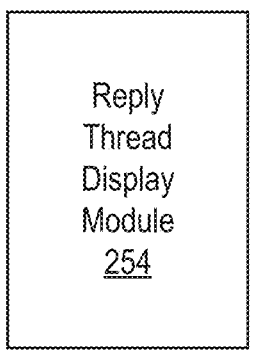
FIG. 2B illustrates an example reply thread module, according to an embodiment of the present technology.
Figure 2B:
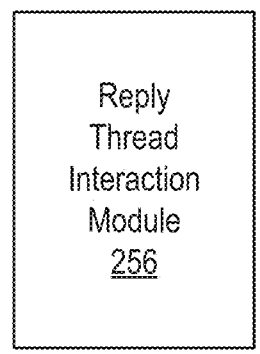

FIG. 2B illustrates an example of a reply thread module 252 configured to generate a reply thread, present the reply thread, and provide for interactions with the reply thread, according to an embodiment of the present technology. In some embodiments, the reply thread module 106 of FIG. 1 can be implemented as the reply thread module 252. As shown in FIG. 2B, the reply thread module 252 can include a reply thread display module 254 and a reply thread interaction module 256.

The reply thread display module 254 can generate a reply thread based on a comment in a comment thread and present the reply thread. In some cases, a comment in a comment thread may not have any replies associated with the comment. Accordingly, a reply thread based on the comment would not have any replies or sub-replies in the reply thread. The reply thread display module 254 can generate the reply thread to include the comment and present the reply thread. The reply thread can display the comment, for example, at the top of the reply thread. The comment can be shaded or colored as an indication that the comment is a topic of the reply thread. The reply thread can additionally display a message indicating that no replies are associated with the comment. For example, a reply thread can display a shaded comment at the top of the reply thread followed by a message, "Be the first to reply . . . " In other cases, a comment in a comment thread may have replies associated with the comment. The reply thread display module 254 can generate a reply thread to include the comment, any replies associated with the comment, and any sub-replies associated with the replies. The replies can be replies posted by users in response to the comment, and the sub-replies can be sub-replies posted by users in response to the replies. The reply thread can display the comment at the top of the reply thread, and the comment can be shaded or colored as an indication that the comment is a topic of the reply thread. The reply thread can display a separator to demarcate between the comment and the replies and sub-replies. In some cases, as a user scrolls through replies in a reply thread, a comment corresponding to the reply thread can remain at the top of the reply thread. This may serve as a reminder to the user what the comment corresponding to the reply thread is.

The reply thread display module 254 can present a reply thread based on arrangements associated with replies and sub-replies in the reply thread. Replies can be displayed in a reply thread based on a first arrangement associated with the replies. Sub-replies can be displayed in a reply thread based on a second arrangement associated with the sub-replies. In some cases, a first arrangement associated with replies in a reply thread and a second arrangement associated with sub-replies in the reply thread can follow a first arrangement associated with comments in a comment thread and a second arrangement associated with replies in the comment thread. For example, replies in a reply thread can be displayed as aligned with a left margin of the reply thread, ordered vertically, and spaced a set distance apart from one another, in accordance with a first arrangement. Sub-replies in the reply thread can be displayed indented from the left margin of the reply thread, ordered vertically apart below the replies with which the sub-replies are associated, and spaced a set distance apart from one another, in accordance with a second arrangement. The first arrangement and the second arrangement in this example may be the same as a first arrangement associated with comments in a comment thread and a second arrangement associated with replies in the comment thread. The comment thread can include a comment associated with the reply thread. In some cases, a reply thread can display replies and a limited number of sub-replies. A reply thread can display a reply and sub-replies associated with the reply based on a number of sub-replies associated with the reply being within a threshold value (e.g., 2, 3, or 4 sub-replies). A reply thread can display a reply and a top sub-reply associated with the reply based on a number of sub-replies associated with the reply exceeding a threshold value. A container indicating a number of sub-replies not displayed in the reply thread can be displayed along with the top sub-reply. In some cases, a threshold value for displaying a limited number of sub-replies in a reply thread can be equal to a threshold value for displaying a limited number of replies in a comment thread. For example, a reply thread can include a reply and four sub-replies associated with the reply. In this example, the number of sub-replies associated with the reply exceeds a threshold value of three sub-replies, and accordingly, the reply thread does not display all four sub-replies. The reply thread can display the reply, a top sub-reply, and a container indicating that three sub-replies are not displayed. The threshold value of three sub-replies can be equal to a threshold value of three replies for displaying a limited number of replies in a comment thread. The comment thread can include a comment associated with the reply thread. In some cases, a reply thread can display replies and sub-replies in an order based on time associated with when each reply and sub-reply was posted. Replies and sub-replies posted more recently in time can be ordered higher in a reply thread than replies and sub-replies posted later in time, or vice-versa. A reply thread can display replies and sub-replies in an order based on a ranking associated with the replies and a ranking associated with the sub-replies. The replies and sub-replies can be ranked based on activity or popularity, as described above. Ranking criteria by which a ranking associated with replies or a ranking associated with sub-replies are determined can be the same as ranking criteria by which a ranking associated with comments in a comment thread is determined. For example, a reply thread can display replies with older replies ordered above newer replies in the reply thread. A reply in the reply thread can be displayed with a top sub-reply out of a number of sub-replies associated with the reply. The top sub-reply can be determined based on a number of likes associated with each sub-reply, and the top sub-reply can have more likes than other sub-replies associated with the reply. A comment thread that includes a comment associated with the reply thread can display comments with top replies similarly determined based on a number of likes associated with each reply associated with each comment. Many variations are possible.

The reply thread interaction module 256 can provide for interactions with a reply thread. Interactions with a reply thread can include posting a reply, navigating to another reply thread, and closing the reply thread. A user can post a reply, which can include text, a content item, or a combination of both, to a reply thread through an input field displayed in the reply thread. A user can navigate to another reply thread by utilizing a touch gesture, such as a swipe gesture or other input. The other reply thread can be a reply thread corresponding to another comment in a comment thread. For example, a user may be presented with a reply thread corresponding to a comment in a comment thread. The user can swipe right on the reply thread and be presented with a next reply thread corresponding to a next comment in the comment thread. The user can swipe left on the next reply thread and be presented with a previous reply thread, which in this example, is the original reply thread. A user can also close a reply thread by utilizing a touch gesture or other input. In some cases, closing a reply thread can allow a user to be presented with a comment thread associated with the reply thread. In other cases, closing a reply thread can also close a comment thread associated with the reply thread. For example, a user may swipe down on a reply thread to close the reply thread and a comment thread associated with the reply thread. Many variations are possible.

The reply thread interaction module 256 can provide for interactions with replies in reply thread and with containers including the replies. A user can select a reply in a reply thread by utilizing a touch gesture, such as a tap, or other input and be presented with another reply thread corresponding to the selected reply. The other reply thread can allow the user to post sub-replies to the selected reply. A container including a reply can include various points of interaction, such as a profile image of a user who posted the reply or a call to action. Replies in a reply thread can be displayed with indications that signify that the replies are interactive. The replies can include, for example, shadows around containers including the replies, shading around or within the containers, or a symbol overlapping or adjacent to the containers. These indications may not be displayed with containers including sub-replies, signifying that the sub-replies are non-interactive. To interact with a sub-reply, a user can select a reply in a reply thread to access another reply thread corresponding to the selected reply. Many variations are possible.

Figure 3:
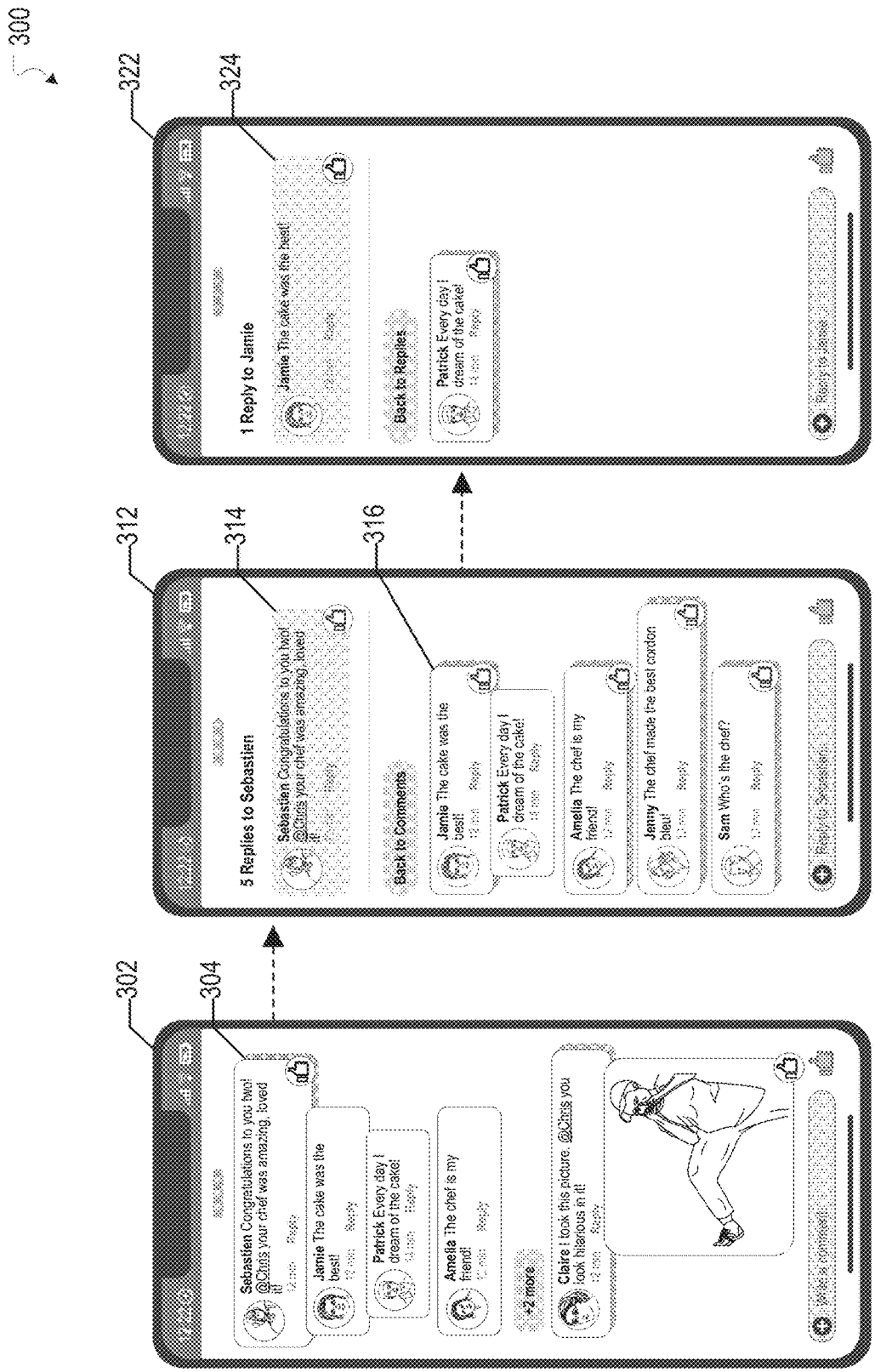
FIG. 3 illustrates a sequence of example interfaces, according to an embodiment of the present technology.

FIG. 3 illustrates a sequence of example interfaces 300, according to an embodiment of the present technology. The sequence of example interfaces 300 may be presented through a display screen of a computing device. The sequence of example interfaces 300 may be provided through an application (e.g., a web browser, a social network application, a messaging application, etc.) running on the computing device.

In this example, a first example interface 302 presents a comment thread including comments, replies, and sub-replies. The comment thread displays a first container 304 including a comment from Sebastien. A user can interact with the first container 304 by tapping on the comment in the first container 304. Upon tapping the comment in the first container 304, the user can be presented with a second example interface 312. The second example interface 312 presents a reply thread corresponding to the comment in the first container 304. As shown in the second example interface 312, the comment in the first container 304 is displayed at the top of the reply thread as a topic 314. The topic 314 can serve as a reminder to the user that the reply thread corresponds with the comment from Sebastien. The reply thread displays a second container 316 including a reply from Jamie. The user can interact with the second container 316 by tapping on the reply in the second container 316. Upon tapping the reply in the second container 316, the user can be presented with a third example interface 322. The third example interface 322 presents another reply thread corresponding to the reply in the second container 316. As shown in the third example interface 322, the reply in the second container 316 is displayed at the top of the other reply thread as a topic 324. The topic 324 can serve as a reminder to the user that the other reply thread corresponds with the reply from Jamie. All examples herein are provided for illustrative purposes, and there can be many variations and other possibilities.

Figure 4A:
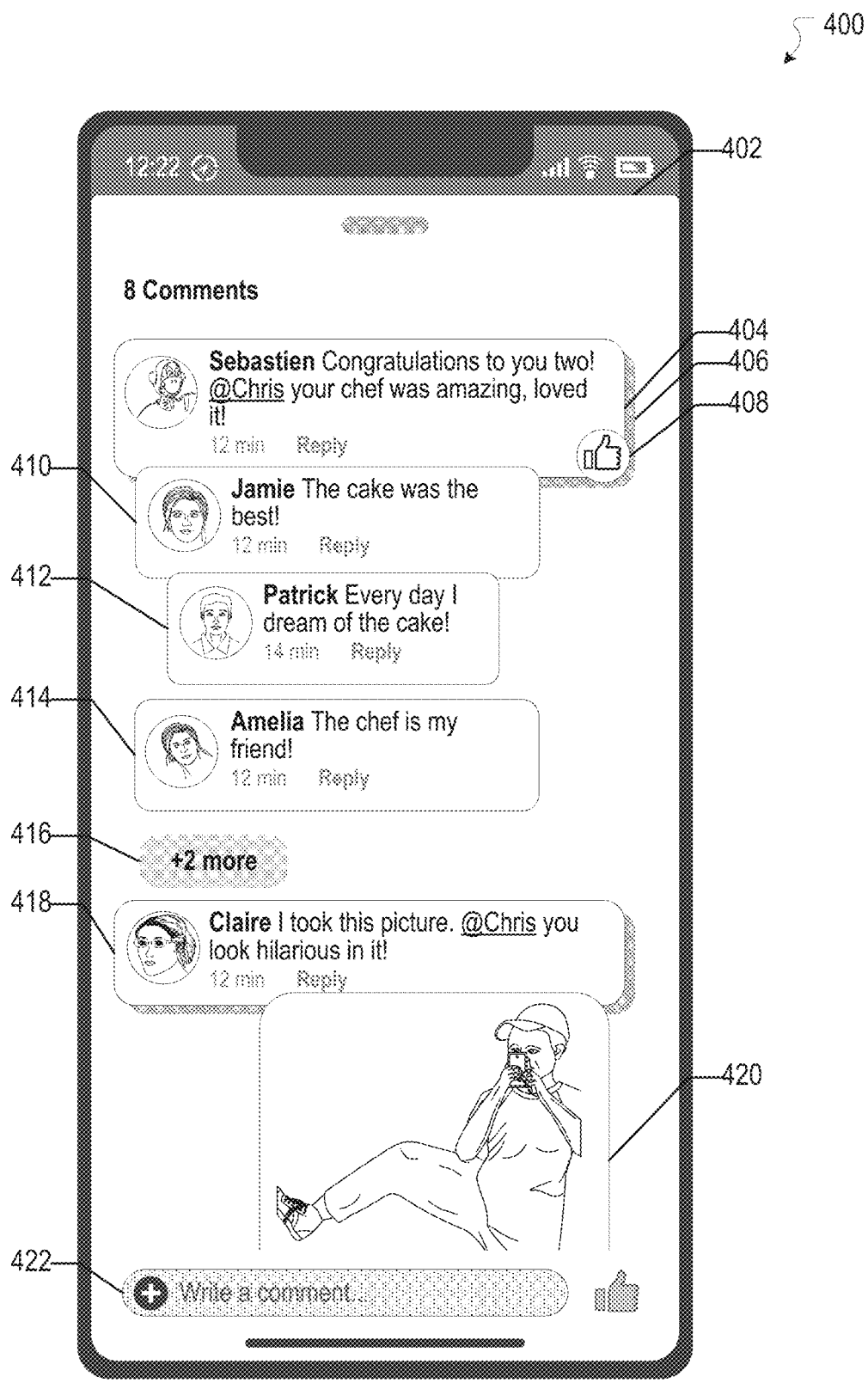
FIGS. 4A-4C illustrate example interfaces, according to an embodiment of the present technology.
Figure 4B:
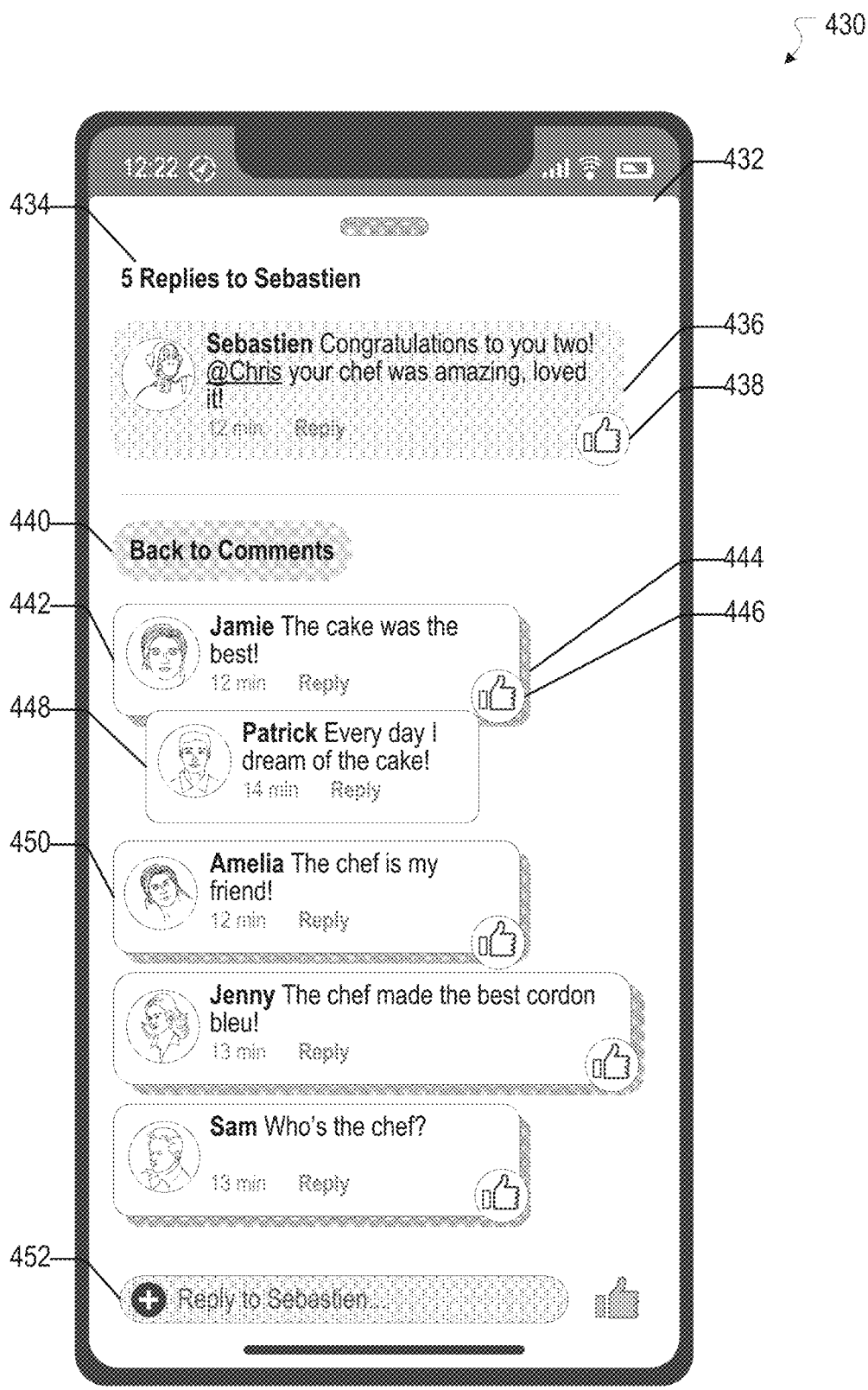
Figure 4C:
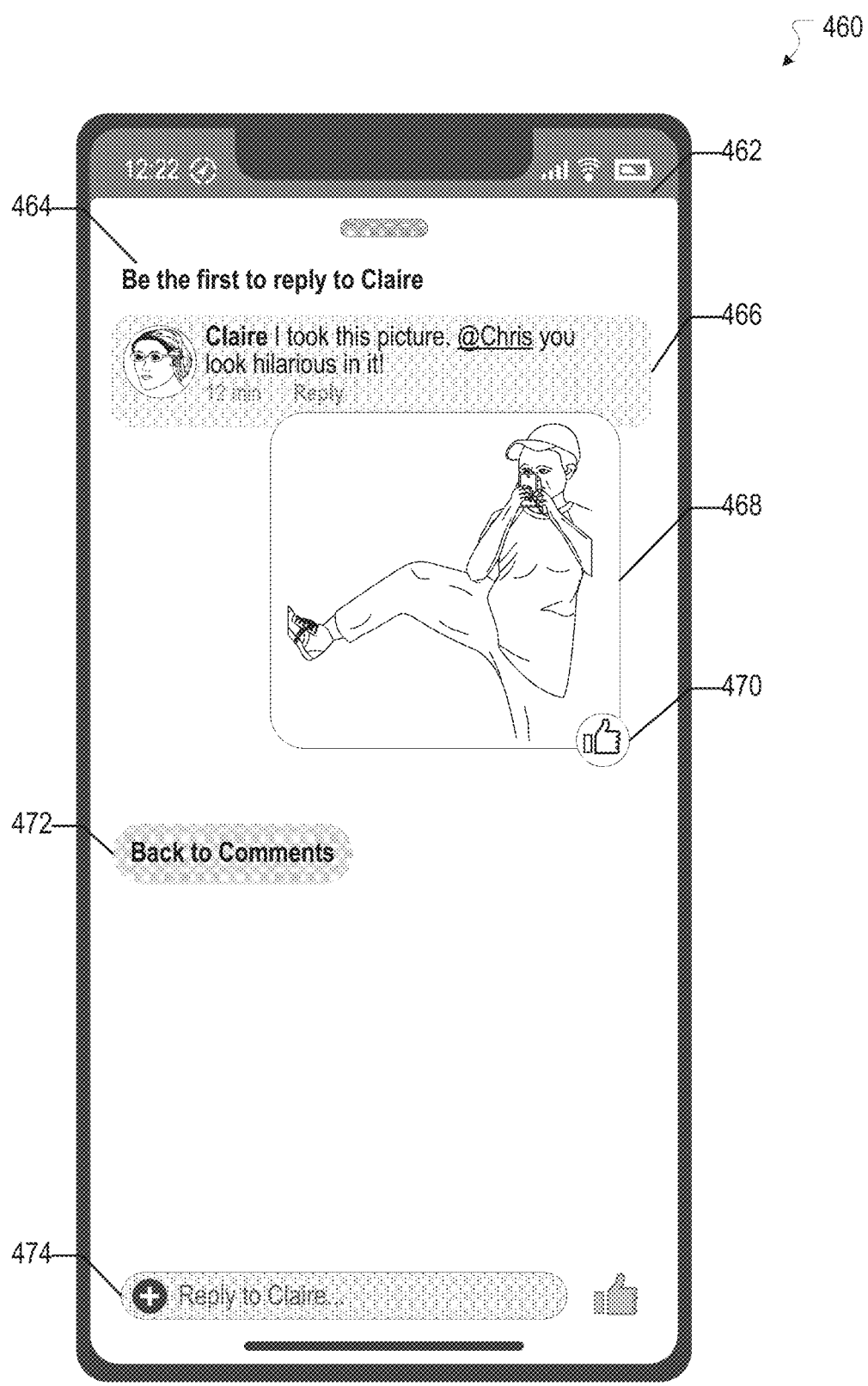

FIG. 4A-4C illustrate example interfaces 400, 430, 460 supported by the communication threading module 102 of FIG. 1, according to an embodiment of the present technology. The example interfaces 400, 430, 460 may be presented through a display screen of a computing device. The example interfaces 400, 430, 460 may be provided through an application (e.g., a web browser, a social network application, a messaging application, etc.) running on the computing device.

FIG. 4A illustrates an example interface 400 presenting a comment thread 402. The comment thread 402 includes comments, replies, and sub-replies. The comment thread 402 displays a first container 404 including a comment from Sebastien. The first container 404 is aligned with a left margin of the comment thread 402, indicating that the first container 404 includes a comment. The first container 404 is displayed with a shadow 406. The shadow 406 indicates that the first container 404 and the comment are interactive. The first container 404 is also displayed with a call to action 408. The call to action 408 allows a user to like the comment. The comment thread 402 also displays a second container 410 including a reply from Jamie. The second container 410 overlaps with the first container 404, indicating that the reply from Jamie is associated with the comment from Sebastian. The second container 410 is indented from the left margin, indicating that the second container 410 includes a reply. The second container 410 is not displayed with a shadow, indicating that the second container 410 is not interactive. The comment thread 402 also displays a third container 412 including a sub-reply from Patrick. The third container 412 overlaps with the second container 410, indicating that the sub-reply from Patrick is associated with the reply from Jamie. The third container 412 is further indented from the left margin, indicating that third container 412 includes a sub-reply. The third container 412 is not displayed with a shadow, indicating that the third container 412 is not interactive. The comment thread 402 also displays a fourth container 414 including a reply from Amelia. The fourth container is indented from the left margin and spaced a set distance from the third container 412. This indicates that the reply from Amelia is associated with the comment from Sebastian. The comment thread 402 also displays a fifth container 416 indicating that there are two more replies associated with the comment from Sebastian. The comment thread 402 also displays a sixth container 418 including a comment from Claire and an image 420 from Claire. The sixth container 418 is aligned with the left margin of the comment thread 402 and spaced a set distance from the fifth container 416. This indicates that the sixth container 418 includes a comment. The image 420 overlaps the sixth container 418, indicating that the image 420 is associated with the comment from Claire. The comment thread 402 also displays an input field 422. A user can utilize the input field 422 to post a comment, a content item, or a combination of both. All examples herein are provided for illustrative purposes, and there can be many variations and other possibilities.

FIG. 4B illustrates an example interface 430 presenting a reply thread 432. The reply thread 432 includes replies and sub-replies. The reply thread 432 displays a number of replies 434, indicating there are five replies in the reply thread 432. The reply thread 432 also displays a topic 436 including a comment from Sebastien. The topic 436 includes a call to action 438, which allows for a user to like the comment from Sebastien. The reply thread 432 also displays a return button 440. A user can select the return button 440 to return to a comment thread associated with the reply thread 432. The reply thread 432 also displays a first container 442 including a reply from Jamie. The first container 442 is aligned with a left margin of the reply thread 432, indicating that the first container 442 includes a reply. The first container 442 is displayed with a shadow 444. The shadow 444 indicates that the first container 442 and the associated reply are interactive. The first container 442 is also displayed with a call to action 446. A user can select the call to action 446 to like the reply from Jamie. The reply thread 432 also displays a second container 448 including a sub-reply from Patrick. The second container 448 is indented from the left margin, indicating that the second container 448 includes a sub-reply. The second container 448 overlaps with the first container 442, indicating that the sub-reply from Patrick is associated with the reply from Jamie. The second container 448 is not displayed with a shadow, indicating that the second container 448 is not interactive. The reply thread 432 also displays a third container 450 including a reply from Amelia. The third container 450 is aligned with the left margin of the reply thread, indicating that the third container 450 includes a reply. The reply thread 432 also displays an input field 452. A user can utilize the input field 452 to post a reply, a content item, or a combination of both. All examples herein are provided for illustrative purposes, and there can be many variations and other possibilities.

FIG. 4C illustrates an example interface 460 presenting a reply thread 462. The reply thread 462 does not include any replies or sub-replies. The reply thread 462 displays a message 464 inviting a user to be the first to post a reply. The reply thread 462 also displays a topic 466 including a comment from Claire. The topic 466 includes an image 468 which was posted by Claire along with the comment. The topic 466 also includes a call to action 470. A user can interact with the call to action 470 to like the comment and the image from Claire. The reply thread 462 also displays a return button 472. A user can select the return button 472 to return to a comment thread associated with the reply thread 462. The reply thread also displays an input field 474. A user can utilize the input field 474 to post a reply, a content item, or a combination of both. All examples herein are provided for illustrative purposes, and there can be many variations and other possibilities.

Figure 5:
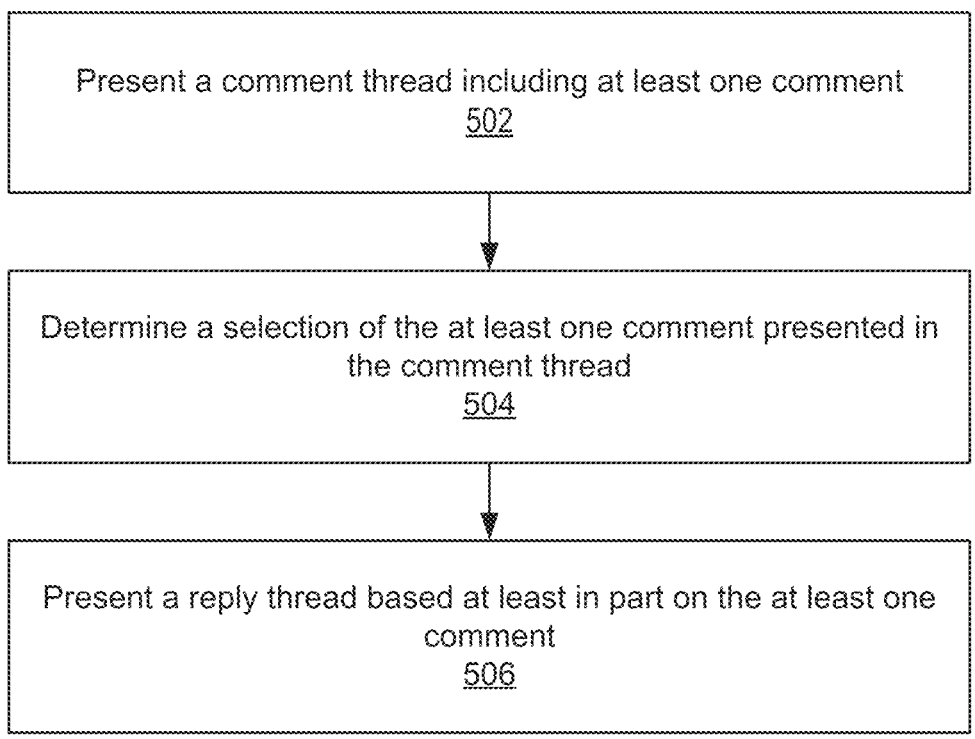
FIG. 5 illustrates an example process for presenting a reply thread, according to an embodiment of the present technology.

FIG. 5 illustrates an example method 500 for presenting a reply thread, according to an embodiment of the present technology. It should be understood that there can be additional, fewer, or alternative steps performed in similar or alternative orders, or in parallel, based on the various features and embodiments discussed herein unless otherwise stated.

At block 502, the example method 500 can present a comment thread including at least one comment. At block 504, the example method 500 can determine a selection of the at least one comment presented in the comment thread. At block 506, the example method 500 can present a reply thread based at least in part on the at least one comment. The example method 500 can be supported or implemented by the communication threading module 102. All examples herein are provided for illustrative purposes, and there can be many variations and other possibilities.

It is contemplated that there can be many other uses, applications, and/or variations associated with the various embodiments of the present technology. For example, in some cases, user can choose whether or not to opt-in to utilize the present technology. The present technology can also ensure that various privacy settings and preferences are maintained and can prevent private information from being divulged. In another example, various embodiments of the present technology can learn, improve, and/or be refined over time.

Social Networking System—Example Implementation

Figure 6:
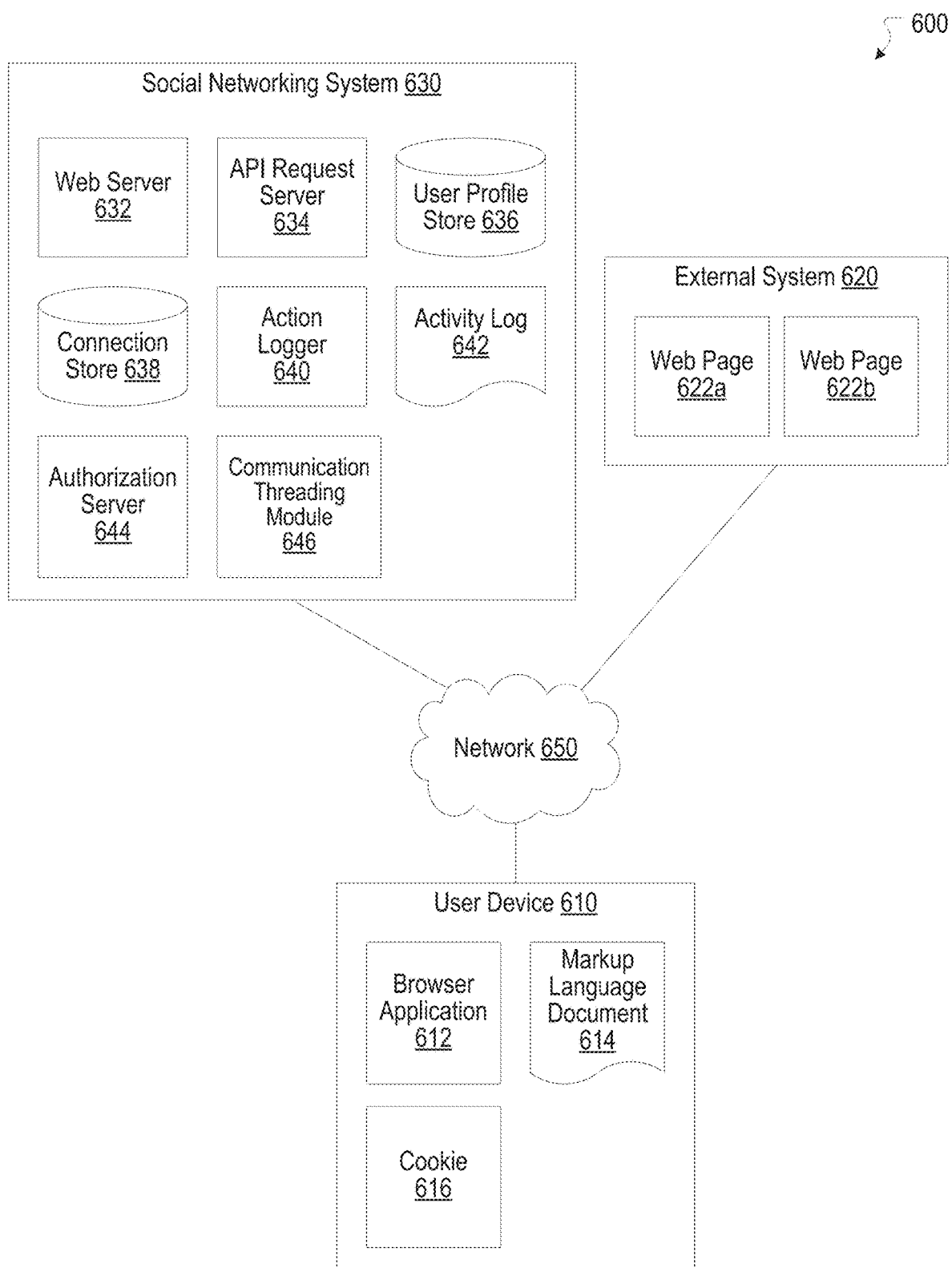
FIG. 6 illustrates a network diagram of an example system including an example social networking system that can be utilized in various scenarios, according to an embodiment of the present technology.

FIG. 6 illustrates a network diagram of an example system 600 that can be utilized in various scenarios, in accordance with an embodiment of the present technology. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a computer system executing, for example, a Microsoft Windows compatible operating system (OS), macOS, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network

650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects another user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music, or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list." External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a communication threading module 646. The communication threading module 646, for example, can be implemented as some or all of the functionality of the communication threading module 102 of FIG. 1. In some embodiments, some or all of the functionality of the communication threading module 646 can be implemented in the user device 610. As discussed previously, it should be appreciated that there can be many variations or other possibilities.

Hardware Implementation

Figure 7:
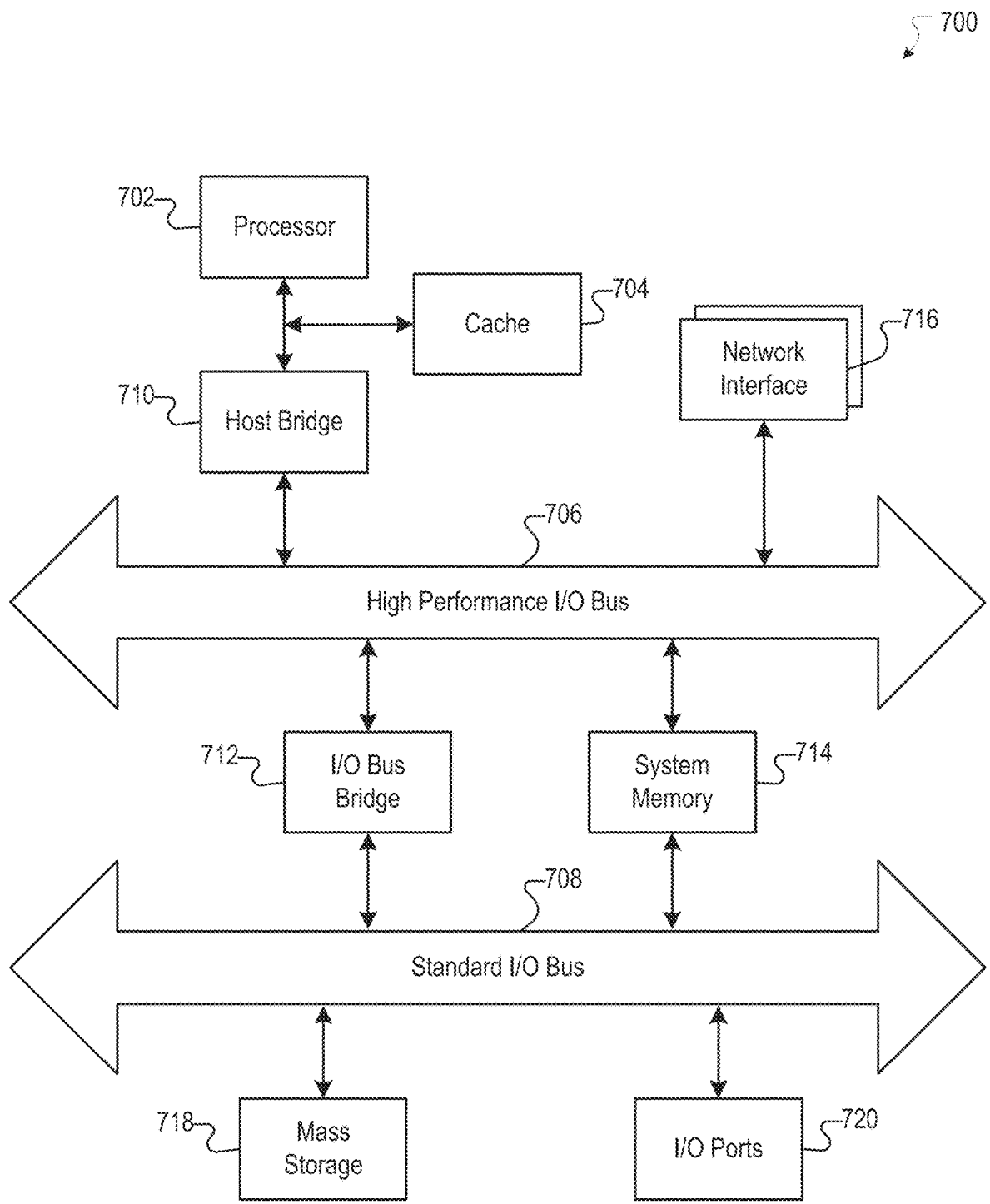
FIG. 7 illustrates an example of a computer system or computing device that can be utilized in various scenarios, according to an embodiment of the present technology.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module," with processor 702 being referred to as the "processor core." Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs." For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the technology can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment," "an embodiment," "other embodiments," "one series of embodiments," "some embodiments," "various embodiments," or the like means that a particular feature, design, structure, or characteristic described in connection with the embodiment is included in at least one embodiment of the technology. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the embodiments of the invention are intended to be illustrative, but not limiting, of the scope of the invention, which is set forth in the following claims.

What is claimed is:

1. A computer-implemented method comprising:
providing, by a computing system, an interface that includes an input field and a comment thread including at least one comment, wherein the input field allows comments to be posted to the comment thread while the comment thread is provided, wherein the at least one comment is presented in the interface with a reply from a reply thread associated with the at least one comment, the reply is indented from the at least one comment and presented with a sub-reply from a sub-reply thread associated with the reply, and the sub-reply is indented from the reply, and wherein the comments in the comment thread are presented with visual indications to indicate that the comments are interactive and provide access to reply threads associated with the comments and wherein replies and sub-replies in the comment thread are non-interactive and do not provide access to the replies and the sub-replies;
determining, by the computing system, a selection of the at least one comment provided in the comment thread;
providing, by the computing system, the reply thread in place of the comment thread in the interface based at least in part on the at least one comment, wherein the reply thread includes the reply associated with the at least one comment, a number of sub-replies within a threshold number, and an indication of a total number of additional sub-replies not included in the reply thread, wherein the reply included in the reply thread is interactive and provides access to a sub-reply thread associated with the reply, and wherein the sub-replies in the reply thread are non-interactive and do not provide access to the sub-replies;
determining, by the computing system, a selection of the reply in the reply thread;
providing, by the computing system, the sub-reply thread associated with the reply in place of the reply thread, wherein the sub-reply thread includes a return button to return to the reply thread, and wherein the input field allows sub-replies to be posted to the sub-reply thread while the sub-reply thread is provided;
posting, by the computing system, a new sub-reply to the sub-reply thread based on an input in the input field while the sub-reply thread is provided;
determining, by the computing system, a selection of the return button in the sub-reply thread to return to the reply thread; and
providing, by the computing system, the reply thread in place of the sub-reply thread.

2. The computer-implemented method of claim 1, further comprising:
determining, by the computing system, a selection of a profile image provided with the at least one comment; and providing, by the computing system, a profile page of a user who posted the at least one comment based on the selection.

3. The computer-implemented method of claim 1, further comprising:
   determining, by the computing system, a selection of the reply thread; and
   providing, by the computing system, a next reply thread based at least in part on a next comment in the comment thread or a previous reply thread based at least in part on a previous comment in the comment thread in response to the selection of the reply thread.

4. The computer-implemented method of claim 1, further comprising:
   determining, by the computing system, a selection of a return button in the reply thread to return to the comment thread; and
   providing, by the computing system, the comment thread based at least in part on the selection of the return button in the reply thread.

5. The computer-implemented method of claim 1, further comprising:
   determining, by the computing system, a selection of the reply thread; and
   closing, by the computing system, the reply thread and the comment thread based at least in part on the selection of the reply thread.

6. The computer-implemented method of claim 1, wherein the at least one comment is associated with a set of replies, the comment thread includes a subset of the set of replies, and the subset is determined based at least in part on a ranking of the set of replies.

7. The computer-implemented method of claim 1, wherein the visual indications include at least one of: shadows, shading, or symbols.

8. The computer-implemented method of claim 1, wherein the reply overlaps with the at least one comment.

9. The computer-implemented method of claim 1, wherein the at least one comment includes a text message and a content item and the reply thread displays the text message and the content item as a topic.

10. The computer-implemented method of claim 1, wherein the selection of the at least one comment is based at least in part on a touch gesture.

11. A system comprising:
    at least one processor; and
    a memory storing instructions that, when executed by the at least one processor, cause the system to perform:
        providing an interface that includes an input field and a comment thread including at least one comment, wherein the input field allows comments to be posted to the comment thread while the comment thread is provided, wherein the at least one comment is presented in the interface with a reply from a reply thread associated with the at least one comment, the reply is indented from the at least one comment and presented with a sub-reply from a sub-reply thread associated with the reply, and the sub-reply is indented from the reply, and wherein the comments in the comment thread are presented with visual indications to indicate that the comments are interactive and provide access to reply threads associated with the comments and wherein replies and sub-replies in the comment thread are non-interactive and do not provide access to the replies and the sub-replies;
        determining a selection of the at least one comment provided in the comment thread;
        providing the reply thread in place of the comment thread in the interface based at least in part on the at least one comment, wherein the reply thread includes the reply associated with the at least one comment, a number of sub-replies within a threshold number, and an indication of a total number of additional sub-replies not included in the reply thread, wherein the reply included in the reply thread is interactive and provides access to sub-reply threads associated with the replies, and wherein the sub-replies in the reply thread are non-interactive and do not provide access to the sub-replies;
        determining a selection of the reply in the reply thread;
        providing the sub-reply thread associated with the reply in place of the reply thread, wherein the sub-reply thread includes a return button to return to the reply thread, and wherein the input field allows sub-replies to be posted to the sub-reply thread while the sub-reply thread is provided;
        posting a new sub-reply to the sub-reply thread based on an input in the input field while the sub-reply thread is provided
        determining a selection of the return button in the sub-reply thread to return to the reply thread; and
        providing the reply thread in place of the sub-reply thread.

12. The system of claim 11, further comprising:
    determining a selection of a profile image provided with the at least one comment; and
    providing a profile page of a user who posted the at least one comment based on the selection.

13. The system of claim 11, further comprising:
    determining a selection of the reply thread; and
    providing a next reply thread based at least in part on a next comment in the comment thread or a previous reply thread based at least in part on a previous comment in the comment thread in response to the selection of the reply thread.

14. The system of claim 11, further comprising:
    determining a selection of a return button in the reply thread to return to the comment thread; and
    providing the comment thread based at least in part on the selection of the return button in the reply thread.

15. The system of claim 11, further comprising:
    determining a touch gesture on the reply thread; and
    closing the reply thread and the comment thread based at least in part on the touch gesture of the reply thread.

16. A non-transitory computer-readable storage medium including instructions that, when executed by at least on processor of a computing system, cause the computing system to perform a method comprising:
    providing an interface that includes an input field and a comment thread including at least one comment, wherein the input field allows comments to be posted to the comment thread while the comment thread is provided, wherein the at least one comment is presented in the interface with a reply from a reply thread associated with the at least one comment, the reply is indented from the at least one comment and presented with a sub-reply from a sub-reply thread associated with the reply, and the sub-reply is indented from the reply, and wherein the comments in the comment thread are presented with visual indications to indicate that the comments are interactive and provide access to reply threads associated with the comments and wherein replies and sub-replies in the comment thread are non-interactive and do not provide access to the replies and the sub-replies;
determining a selection of the at least one comment provided in the comment thread;
providing the reply thread in place of the comment thread in the interface based at least in part on the at least one comment, wherein the reply thread includes the reply associated with the at least one comment, a number of sub-replies within a threshold number, and an indication of a total number of additional sub-replies not included in the reply thread, wherein the reply included in the reply thread is interactive and provides access to a sub-reply thread associated with the reply, and wherein the sub-replies in the reply thread are non-interactive and do not provide access to the sub-replies;
determining a selection of the reply in the reply thread;
providing the sub-reply thread associated with the reply in place of the reply thread, wherein the sub-reply thread includes a return button to return to the reply thread, and wherein the input field allows sub-replies to be posted to the sub-reply thread while the sub-reply thread is provided;
posting a new sub-reply to the sub-reply thread based on an input in the input field while the sub-reply thread is provided;
determining a selection of the return button in the sub-reply thread to return to the reply thread; and
providing the reply thread in place of the sub-reply thread.

17. The non-transitory computer-readable storage medium of claim 16,
   determining a selection of a profile image provided with the at least one comment; and
   providing a profile page of a user who posted the at least one comment based on the selection.

18. The non-transitory computer-readable storage medium of claim 16,
   determining a selection of the reply thread; and
   providing a next reply thread based at least in part on a next comment in the comment thread or a previous reply thread based at least in part on a previous comment in the comment thread in response to the selection of the reply thread.

19. The non-transitory computer-readable storage medium of claim 16, further comprising:
   determining a selection of a return button in the reply thread to return to the comment thread; and
   providing the comment thread based at least in part on the selection of the return button in the reply thread.

20. The non-transitory computer-readable storage medium of claim 16, further comprising:
   determining a touch gesture on the reply thread; and
   closing the reply thread and the comment thread based at least in part on the touch gesture of the reply thread.

* * * * *